United States Patent [19]

Chum et al.

[11] Patent Number: 4,661,303

[45] Date of Patent: Apr. 28, 1987

[54] REACTIVE COEXTRUSION OF FUNCTIONALIZED POLYMERS

[75] Inventors: Pak-Wing S. Chum; Mark A. Barger; Thuan P. Dixit; James E. Schuetz, all of Midland, Mich.

[73] Assignee: The Dow Chemical Company, Midland, Mich.

[21] Appl. No.: 743,238

[22] Filed: Jun. 11, 1985

[51] Int. Cl.$^4$ .............................................. B29C 47/04
[52] U.S. Cl. ...................... 264/171; 264/211; 425/131.1; 425/133.5; 425/462; 428/518
[58] Field of Search ...................... 264/171, 173, 211; 425/131.1, 133.5, 462; 428/518

[56] References Cited

U.S. PATENT DOCUMENTS

| | | | |
|---|---|---|---|
| 3,565,737 | 2/1971 | LeFeure et al. | 264/171 |
| 3,589,976 | 6/1971 | Erb | 428/515 |
| 3,779,840 | 12/1973 | Walles | 156/3 |
| 4,233,367 | 11/1980 | Ticknor et al. | 264/514 |
| 4,292,355 | 9/1981 | Bonis | 264/171 |
| 4,350,742 | 9/1982 | Hall et al. | 428/520 |
| 4,361,628 | 11/1982 | Krueger et al. | 264/184 |
| 4,415,519 | 11/1983 | Strassel | 264/171 |

FOREIGN PATENT DOCUMENTS

| | | | |
|---|---|---|---|
| 281632 | 8/1965 | Australia | 264/171 |
| 56-10429 | 2/1981 | Japan | 264/171 |
| 56-10177 | 3/1981 | Japan | 264/171 |
| 57-156224 | 9/1982 | Japan | 264/171 |
| 59-229338 | 12/1984 | Japan | 264/171 |

*Primary Examiner*—Jeffery Thurlow

[57] ABSTRACT

A method for preparing a polymeric laminate by the reactive coextrusion of functionalized polymers wherein at least one layer is a polymer having functional groups and the adjacent layer is a polymer having coreactive groups which form covalent bonds with the functional groups at the interfacial surfaces. One such functional group can comprise a pendant cyclic imino ether group to form covalent bonds with the coreactive groups. A laminate having a plurality of layers covalently bonded together through the interaction of pendant cyclic imino ether groups and coreactive groups is also provided.

12 Claims, No Drawings

REACTIVE COEXTRUSION OF FUNCTIONALIZED POLYMERS

BACKGROUND OF THE INVENTION

The present invention is directed toward the reactive coextrusion of functionalized polymers into a multi-layered film or sheet. The subject layers are chemically adhered by covalent bonds formed from reactive groups present at the interfacial surface of the layers.

Frequently, it is desirable to adhere one layer of polymer to another in order to form laminates. This can be difficult, however, due to the incompatible nature of the respective polymers. One manner of overcoming the incompatible nature of dissimilar polymers is to incorporate a glue layer or otherwise applying a surface treatment to the surfaces of the various layers. For example, polystyrene, polypropylene laminates are prepared in U.S. Pat. No. 3,779,840 by employing a sulfonated surface treatment on one olefin with an application of an epoxy resin and U.S. Pat. No. 4,361,628 discloses the use of an adhesive layer comprising polypropylene blended with a polypropylene grafted with maleic anhydride to form nylon, polypropylene extruded laminates.

While suitable laminates can be prepared by employing adhesives or other surface treatments, better methods of bonding dissimilar polymeric films are continually sought in order to avoid the use of foreign or specialty materials such as adhesives. Non-adhesive methods would eliminate the bonding layer and allow additional layers of the component polymers to be utilized.

Attempts to form laminates in the absence of adhesives have been conducted as demonstrated in U.S. Pat. Nos. 3,589,976 for a polyethylene, polystyrene, polyethylene three-layer coextrusion; 3,809,602 for coextruded saran, acrylo-butyl-styrene laminates; and 4,350,742 for an acrylic and styrene laminate film wherein the styrene contains a minor amount of an $\alpha,\beta$-unsaturated carboxylic acid. Despite the foregoing attempts, improvements in the preparation of laminates with dissimilar polymers is still sought. This is especially true for laminates containing microlayers of polyolefin films.

SUMMARY OF THE INVENTION

The present invention provides for a method for preparing a polymeric laminate comprising the reactive coextrusion of functionalized polymers; wherein, at least one layer of the laminate can be polymers having pendant cyclic imino ether groups and the adjacent layers of the laminate are polymers having coreactive groups comprising an active hydrogen capable of forming a covalent bond with the pendant cyclic imino group at the interfacial surface of the layers. The cyclic imino ether group is generally 2-oxazoline, more preferably 2-isopropenyl-2-oxazoline. The cyclic imino ether group can be present in the respective layers from about 0.01 to about 10 percent by total weight polymer. The coreactive group containing active hydrogen can be an amine, carboxylic acid, hydroxyl, mercaptan, epoxy or anhydride group. One such carboxylic group can be contributed by an $\alpha,\beta$-ethylenically unsaturated carboxylic acid, to wit, acrylic acid. The coreactive group is generally present in the respective layer from about 0.01 to about 10 percent by weight total polymer. The pendant cyclic amino ether groups can be copolymers of styrene, 2-isopropenyl-2-oxazoline. This copolymer can be grafted onto a polymer of an ethylene, propylene, diene monomer. Furthermore, the coreactive groups can be contributed by copolymers of ethylene, acrylic acid; ethylene maleic anhydride; or methacrylic acid. In one aspect the methacrylic acid can be copolymerized with vinylidene chloride.

The present invention further provides for a laminate comprising a plurality of layers wherein the layers are effectively adhered by covalent bonds formed at the interfacial surface of the layers. The covalent bonds formed by the interaction of a pendant cyclic imino ether group present in the polymer of one layer with a coreactive group having an active hydrogen present in the polymer of an opposing layer. The cyclic imino ether group and coreactive groups can be those as described above and can be copolymerized with polymers as described above.

The present invention provides the advantages of eliminating processing complications caused by the manufacture of laminates through the use of glue layers or adhesives. For example, the need to match the viscosity of the glue with the substrate during coextrusion to fabricate the laminate is eliminated, the need to match the viscosity of the glue layers with substrates during the thermoforming of the laminate is eliminated and the absence of the glue layer in the laminate will simplify fabrication. Further, the subject process allows the fabrication of multi-layered thin films or coextruded microlayer films with controllable interfacial adhesion which allows greater processing flexibility and control of end use properties.

DETAILED DESCRIPTION OF THE INVENTION

The present invention provides for the reactive coextrusion of various polymeric layers wherein the layers are chemically bonded by the formation of covalent bonds at their interfacial surfaces. The covalent bonds are formed by employing functionalized polymers in the coextrusion of the polymeric layers. The subject functionalized polymers allow for the preparation of laminates in the absence of adhesive, tie-layers, or surface preparation and for controllable interfacial adhesive properties. In addition, the subject method allows for the preparation of laminates from normally incompatible polymers.

A model for the reactive coextrusion of polymers to form a laminate is by employing functionalized polymers wherein one polymer contains a pendant cyclic imino group and the other polymer contains a coreactive group having an active hydrogen capable of forming a covalent bond with a pendant cyclic imino ether group. The chemical reaction is generally described as a ring-opening reaction. The preferred cyclic imino ether groups are 2-oxazolines and the preferred coreactive groups are carboxylic acid, anhydrides, amines, hydroxyl, mercaptan or epoxy groups.

The subject laminates are formed by coextruding a functionalized polymer containing a cyclic imino ether group in tandem with a polymer containing a coreactive group. The contacting of the two functionalized polymeric layers at their interfacial surface is sufficient to result in the ring-opening reaction to take place and; therefore, covalently bond the two polymeric layers together. This operation can be repeated over and over to form a laminate having a plurality of layers wherein alternating layers comprise one of the functional groups and the remaining layers comprise the other functional group.

The subject process is particularly adaptable to microlayer coextrusion and in the lamination of polymers having dissimilar or even incompatible characteristics. Those polymers which can be laminated together are only limited by the ability to functionalize those polymers into containing either of the reactive groups, i.e., the cyclic imino ether group or coactive group.

Thus, the present invention requires a polymer having a pendant cyclic imino ether group. The subject cyclic imino ether groups are structurally depicted as follows:

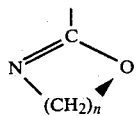

wherein each R is independently hydrogen, or an inertly substituted hydrocarbon containing 1 to 18 carbon atoms; and n is a number from about 1 to about 5. Said cyclic imino ether group can be attached to the polymer chain through any of the carbon atoms in the ring. Preferably, the cyclic imino ether is a 2-imino ether, i.e. is attached to the polymer chain through the 2-carbon atom to yield a structure as defined above. Preferably, each R is hydrogen or lower alkyl and n is 1, 2 or 3. Most preferably, each R is hydrogen, n is 2 and the cyclic imino ether is a 2-oxazoline group. By "inertly substituted" it is meant that the reference group contains no functional group which interfers with the polymerization or curing of the oxazoline group.

Polymers containing repeating units having pendant cyclic imino ether groups are advantageously prepared by the polymerization of a monomer mixture comprising an ethylenically unsaturated monomer containing a cyclic imino ether group. Preferably, such monomer is a 2-alkenyl-2-oxazoline wherein said alkenyl group contains from about 2 to about 8, preferably 2 to 4 carbon atoms. Most preferably said monomer is 2-isopropenyl-2-oxazoline (isopropenyloxazoline or IPO). Monomers of 2-isopropenyl-2-oxazoline are preferred because of their excellent stability under extruder conditions thereby greatly facilitating the preparation of a wide variety of laminates.

Polymers containing pendant cyclic imino ether groups are reacted with polymers containing coactive groups at the interfacial surface in order to form laminates thereof. The coactive group may be pendant to the polymer, may form terminal groups thereon or may be incorporated into the polymer backbone thereof. Coactive groups are electrophilic groups containing an active hydrogen such as an amine, carboxylic acid, hydroxyl, mercaptan, epoxy, or anhydride group. Polymers containing coactive groups along the polymer backbone include, for example, polyamines, such as the diverse polyalkylene amines; and the like. Polymers containing terminal coactive groups include, for example, diverse polysulfides (THIOKOLS), epoxy resins and polyalkylene glycols.

Generally, polymers which can be employed to form covalent bonds with the cyclic imino ether containing polymers have coactive groups derived from an addition polymerizable monomer containing the desired coactive group. Preferred are polymers or copolymers having repeating units derived from α,β-ethylenically unsaturated monomers containing the coactive groups. Examples are polymers of unsaturated carboxylic acids, such as acrylic acid, methacrylic acid, itaconic acid, maleic acid, and the like; unsaturated amines, such as vinyl amines, and the like; and epoxy groups such as oxirane. In addition, polymers of other monomers which can be chemically modified to form pendant coactive groups in the polymers such as acrylonitrile, are usefully employed herein.

The polymer contains at least a sufficient amount of the coactive groups to effectively form sufficient covalent bonds with the cyclic imino ether groups present on the other polymer to adhesively bind the two films together. The amount of the coactive group necessary in order to form this bond will depend on the particular polymers employed in the layers as well as the relative proportion of the polymer and to the imino ether groups present on the other layer. However, as with the imino ether group, a sufficient amount of the coactive group is typically present when at least about 0.01 weight percent of the polymer contains coactive groups. When the coactive group is an inherent part of the structure of the homopolymer backbone, as many as a 100 weight percent of such repeating units in the polymer may contain coactive groups. Typically, when the coactive group is a pendant group incorporated into a polymer for the primary purpose of chemically bonding the laminate of this invention, it is preferred that the repeating units containing said coactive groups comprise from about 0.01 to about 10, more preferably from about 0.1 to about 5, weight percent of the polymer.

Whereas, the amount of coactive groups present in the polymer layer can be adjusted and whereas the pendant cyclic imino ether group present in the other polymer which makes up an opposing layer can be adjusted, one can selectively determine the amount of functional groups present at the interfacial surface and thus control the interfacial adhesion of the respective laminate layer. That is, an excess of functional groups (i.e., cyclic imino ether or coactive groups) present at the interfacial surface will form a tenacious and very strong bond whereas by adjusting the functional groups in the polymer layers to contain only a minor amount of functional groups would form a weak but still chemical adhesive bond between the layers. Adjusting the functional groups anywhere between these two extremes would allow the practitioner to form laminates having a varying degree of adhesive qualities. Likewise, by being able to vary the degree of adhesion the mechanical properties of the laminates can be influenced such as tensile, impact strength and ductility.

In addition to adjusting the functional groups to control the degree of adhesion between the layers, adjustment of the parameters surrounding the formation of the laminate such as time and temperature can also be made. For example, increasing the reaction time or contact time can result in the formation of more covalent bonds between the functional groups thereby increasing adhesion. Increasing the temperature of the various layers will increase the rate of reactivity in accordance with the kinetics of the reaction.

Thus, in the preparation of the subject laminates from polymers containing the functional groups, one of the polymers must be a polymer of a monomer which (a) can be modified to contain pendant cyclic imino ether groups or (b) can be copolymerized with a monomer which contains or can be modified to contain pendant cyclic imino ether groups. In the preferred embodiment, the polymer is advantageously a polymer of an addition polymerizable monomer copolymerizable with a monomer with an ethylenically unsaturated cyclic imino ether.

Representative polymers of said addition polymerizable monomers are polymers of a lower alkene, particularly a $C_1$-$C_8$ alkene, more particularly, ethylene or propylene as well as copolymers thereof; a conjugated diene such as butadiene or isoprene as well as copolymers thereof; a vinylidene halide such as vinylidene chloride or copolymers thereof; vinyl acetate; an ether of an $\alpha,\beta$-ethylenically unsaturated carboxylic acid such as alkyl esters of acrylic or methyl acrylic acid and copolymers thereof; a monovinylidene aromatic compound such as styrene, vinyltoluene, t-butyl styrene, vinylnaphthalene and the like. Ethylenically unsaturated cyclic iminoethers, in particular 2-alkenyl-2-oxazolines, generally resemble styrene in their polymerization reactions. Accordingly, as a rule of thumb, polymers of monomers which are copolymerizable with styrene will generally be usefully employed herein. Due to the polymerization reactions of 2-alkenyl-2-oxazolines and the tendency for styrenic polymers to be incompatible with a wide range of other thermoplastic materials, it is preferred that the first polymer be a polymer of a 2-alkenyl-2-oxazoline and styrene, especially 2-isopropenyl-2-oxazoline and styrene.

Additionally, in the preparation of the polymeric laminate prepared according to the subject invention, one of the polymeric layers must contain a coreactive group as described hereinbefore. In order to be useful herein said polymer is generally a copolymer of an addition polymerizable monomer which contains said coreactive group or which can be treated subsequent to polymerization to impart the coreactive group thereto. For example, any of the aforementioned addition polymers can be copolymerized with an addition polymerizable carboxylic acid to impart carboxyl groups to the polymer. Amino groups, amide groups and the like coreactive groups can be imparted to the polymer in a similar manner by copolymerizing a monomer mixture containing the desired proportion of an addition polymerizable monomer containing such group. Also, graft or block copolymers wherein at least one of the grafted segments or blocks contain a reactive group can be employed herein.

Examples of functionalized copolymers include but are not limited to vinylidene chloride/methacrylic acid, ethylene/acrylic acid, maleic anhydride or methacrylic acid, styrene/acrylic acid or maleic anhydride, and graft copolymers thereof. Grafted copolymers can generally include a polyolefin and a coreactive group such as polyethylene and maleic anhydride.

Polymers of certain monomers such as vinyl or vinylidene halide or acrylonitrile can be modified after the polymerization thereof to impart coreactive moieties thereto. For example, vinyl chloride can be reacted with ammonia or a primary amine to place pendant amine groups on the polymer. Similarly, acrylonitrile can be hydrogenated after its polymerization to form pendant amine groups.

Certain other polymers which normally contain coreactive groups may be employed herein which will avoid the step of having to treat the polymer to provide the coreactive group. For instance, polymers which naturally have an electrophilic group containing an active hydrogen in the polymer chain or end groups thereof are suitable. For example, polymers containing repeating amine linkages, such poly(ethyleneimine) or a partially hydrolyzed poly(2-alkyl-2-oxazoline) are suitable as the other polymer herein. Other suitable polymers include those which contain amine, carboxylic acid, hydroxyl, epoxy, mercaptan, anhydride and the like groups in the polymer chain or as end groups thereof.

For polymers which do not normally contain coreactive groups it is generally desirable to prepare them with only relatively small amounts of said coreactive groups. This is because it is usually desirable to minimize the effect of the coreactive group or monomers containing said coreactive group on the physical properties of such a polymer. The presence of large amounts of certain reactive groups, such as acid groups, can cause the laminate to have certain undesirable properties such as water-sensitivity, adhesion to molds and corrosion of molds. It is usually desirable to employ a coreactive group containing polymer having physical characteristics similar to those of the polymer which does not contain coreactive groups. For example, a copolymer of ethylene and acrylic acid can be employed. In order to make the properties of said ethylene/acrylic acid polymer resemble those of polyethylene as closely as possible, it is generally desirable to employ an ethylene acrylic acid copolymer having an acrylic acid content not greatly in excess of that required to adhere the laminate layers.

The reactive coextrusion of polymer layers containing the functional groups is advantageously used to prepare laminates from normally incompatible component polymers. Typically, the covalent bonds between the functional groups are formed by the application of a moderate amount of heat to the polymeric layers. Generally, this heat is provided inherently by the coextrusion mechanism. The amount of heat required is typically dependent on the particular coreactive groups employed. In general, carboxylic acid groups are more reactive than the amide, amine or hydroxyl groups and therefore require lower temperatures to form covalent crosslinking.

Conventional extruder methods for forming coextruded multilayer films provide sufficient temperature to cause the formation of covalent linkages at the interfacial surface of the various polymeric layers. Generally, and especially when the coreactive group is a carboxylic acid, such linkages are formed in a minute or less or at the temperatures used to coextrude the polymers. It can be desirable to additionally press the laminate as it is being formed in order to insure contact between the coextruded layers and to provide increased contact time or residence time at the interfacial surfaces. As indicated earlier, the subject invention provides an excellent method for preparing coextruded laminates of the component polymers without the necessity for employing an adhesive layer or other surface preparation. Even more advantageously, the subject invention provides a method for selectively adjusting the bonding characteristic between the respective layers. For example, in one portion of the laminate, the interfacial bonding can be increased by increasing the functional groups and at another point in the laminate, the interfacial bonding can be lower by again adjusting the functional groups present at the particular layers at that point in the laminate.

The following examples are provided to illustrate the invention and are not intended to limit the scope thereof. All parts and percentages are by weight unles otherwise indicated.

EXAMPLE I

Two layer laminates containing sheets of polystyrene and polyethylene were prepared by compression molding wherein the adhesion was provided by covalent bonds formed from the interaction of functional groups provided by isopropenyloxazoline present in the polystyrene sheets and by acrylic acid in the polyethylene sheets. In addition, various concentrations of isopropenyloxazoline (IPO) and acrylic acid were tested to controllably adjust the interfacial adhesion.

The sheets were prepared from copolymers of polystyrene-isopropenyloxazoline (5 percent isopropenyloxazoline), SIPO, and polyethylene acrylic acid (6.5 percent acrylic acid), EAA. The functional groups for each copolymer were adjusted by diluting the respective copolymer with polystyrene or polyethylene. To demonstrate the effect of the functional group interaction a comparative laminate was prepared from styrene without a functional group and EAA. The laminate adhesive strengths were measured by a 90° Peel Test and are listed in Table I along with the percent functional groups present in each layer.

TABLE I

| Laminate Sample | IPO Weight Percent In Polystyrene | Acrylic Acid Weight Percent In Polyethylene | Adhesive Strength (lb/in) 90° Peel Test |
|---|---|---|---|
| 1 | 0 | 6.5 | 0 |
| 2 | 5.0 | 6.5 | Cohesive failure, no delamination |
| 3 | 2.5 | 6.5 | 14.5 |
| 4 | 1.0 | 6.5 | 13.5 |
| 5 | 5.0 | 4.9 | 13.0 |
| 6 | 5.0 | 2.9 | 6.0 |
| 7 | 5.0 | 3.5 | 6.0 |

The adhesive strength data indicates at Laminate Sample 1 that in the absence of the complimentary functional group a successful laminate could not be formed. Samples 2-7 show that when the complimentary functional groups were present a laminate having interfacial adhesion was formed. Samples 2-7 show that by adjusting the amount of functional groups present in either laminate layer that the interfacial adhesion could be adjusted.

EXAMPLE II

A two layer laminate containing sheets of impact modified polystyrene and saran were prepared by compression molding wherein the adhesion was provided by covalent bonds formed at the interfacial surfaces. The covalent bonds were formed from the interaction of functional groups provided by isopropenyloxazoline present in the impact modified polystyrene sheets and by methacrylic acid in the saran sheets.

The sheets were prepared from a graft copolymer of polystyrene-isopropenyloxazoline and ethylene propylene diene rubber (EPDM) (5 percent isopropenyloxazoline, 15 percent EPDM and 80 percent styrene), and functionalized saran terpolymer (7.5 percent methacrylate, 1.0 percent methacrylic acid and 91.5 percent vinylidene chloride). To demonstrate the effect of the functional group interaction a comparative laminate was prepared having saran without a functional group and functionalized impact modified polystyrene. The laminate adhesive strengths were measured by a 90° Peel Test. The laminate prepared with the functionalized saran terpolymer had an adhesive strength of greater than 24.5 lb/in while the comparative example prepared without a functional group on the saran had no adhesion.

EXAMPLE III

Three layer laminates were prepared by the reactive coextrusion of polymers of styrene-isopropenyloxazoline (5 percent IPO), SIPO, and ethylene acrylic acid (6.5 percent acrylic acid), EAA. The three layer coextrusion laminate consisted of a film of EAA as outer layers with an intermediate layer of SIPO. The temperature profile of the extrusion measured at the barrel was 320° F. for EAA, 430° F. for SIPO and a die temperature of 400° F. The EAA polymer was extruded at approximately 500 psi and the SIPO at approximately 1000 psi. The die opening was 25 mil. The average total contact time, or time the layers were in contact in the die, was 76 seconds while the contacting time of the fully developed layers in the die lip was 12 seconds. The extrudate was a 10 mil sheet which was cut into 1 inch strips such that interfacial 180° peel adhesion strengths could be measured.

In addition to extruding the three layer laminate as described above the IPO level in the SIPO layer was varied to demonstrate that the interfacial adhesion could be adjusted. The level of IPO was adjusted by diluting the SIPO with additional polystyrene. Results for the interfacial 180° peel strengths are shown in Table II along with the IPO level. A comparative example having no IPO in the intermediate layer was also prepared and is shown in Table II as Sample 1.

TABLE II

| Laminate Sample | IPO Weight Percent In Polystyrene | Interfacial 180° Adhesion Strength (lb/in) |
|---|---|---|
| 1 | zero | zero |
| 2 | 1 | 0.5 |
| 3 | 2.5 | 2.5 |
| 4 | 5.0 | 4.5 |
| 5 | 2.5* | 4.0 |

*Coextruded laminate was exposed to 120° C. heat lamp for 60 seconds after extrusion.

The data indicates that the coextruded laminates of Samples 2-5 were adhered by the functionalized polymeric layers; whereas, Sample 1, which contained no complimentary functional group (i.e., IPO), showed no adhesion. Additionally, Sample 5 indicates that a post-cure of 120° C. for 60 seconds enhanced the adhesion of the laminate layer by increasing the reaction time of the functional groups. Also evident from the data is that the interfacial adhesion was controllably adjusted by varying the amount of IPO functional group present in the intermediate laminate layer.

EXAMPLE IV

A microlayer extruded sheet of ethylene acrylic acid (5 percent acrylic acid), EAA, and polystyene/isopropenyloxazoline (5 percent isopropenyloxazoline), SIPO, was prepared. As a comparison, a similar microlayer coextrusion was prepared in the absence of any IPO in the polystyrene layers. The microlayer coextrusion was run at a temperature profile of 365° F. for the EAA at 1200 psi, 450° F. for the SIPO at 1600 psi. The die was 410° F. and had an opening of approximately 75 mil. The total layer contact time was approximately 10 minutes. The final extrudate had 97 layers and measured 11 inches by 55 mil. The compositional content of the extrudates was approximately 80 percent EAA and 20 percent styrene.

Due to the nature of a microlayer sheet, the interfacial adhesion was not quantifiable; however, the functionalized microlayer sheet could not be delaminated by any means while the comparative microlayer sheet having no IPO functional groups present in the polystyrene layers could be delaminated by simply applying external force. In addition, the impact strength of each laminate was measured on a dart impact tester. The functionalized microlayer sheet had an impact value of 42 in-lb/50 mil and the comparative microlayer sheet had an impact value of 30 in-lb/50 mil. This demonstrates the improvement in mechanical properties for a laminate having better interfacial adhesion.

What is claimed is:

1. In a method of forming a multilayered laminate by coextruding alternate layers of two incompatible polymers without the use of an adhesive layer, the improvement which comprises the steps of
   (a) modifying the first polymer to have pendant cyclic imino ether groups, and
   (b) modifying the second polymer to have coreactive groups comprising an active hydrogen capable of forming a covalent bond with the pendant cyclic imino ether group of the first modified polymer at the interfacial surface of the layers, the modifications occurring prior to the coextrusion step, whereby the adhesion bond between the alternate layers is increased.

2. The method of claim 1 wherein said pendant cyclic imino ether group is 2-oxazoline.

3. The method of claim 2 where said 2-oxazoline is formed from 2-isopropenyl-2-oxazoline.

4. The method of claim 1 wherein said cyclic imino ether group is present in respective layers from about 0.01 to about 10 percent by total weight polymer.

5. The method of claim 1 wherein said coreactive groups containing an active hydrogen is an amine, carboxylic acid, hydroxyl, mercaptan, epoxy or anhydride group.

6. The method of claim 5 where said carboxylic acid is formed from an $\alpha,\beta$-ethylenically unsaturated carboxylic acid.

7. The method of claim 6 where said $\alpha,\beta$-ethylenically unsaturated carboxylic acid is acrylic acid.

8. The method of claim 1 where said coreactive group is present in respective layers from about 0.01 to about 10 percent by total weight polymer.

9. The method of claim 1 where said polymers having pendant cyclic imino ether groups are copolymers of styrene/2-isopropenyl-2-oxazoline.

10. The method of claim 9 where said copolymer is grafted onto a polymer of an ethylene/propylene/diene monomer.

11. The method of claim 1 where said polymer having coreactive groups are copolymers of ethylene/acrylic acid, maleic anhydride, or methacrylic acid.

12. The method of claim 11 where said methacrylic acid is copolymerized with vinylidene chloride.

* * * * *

UNITED STATES PATENT AND TRADEMARK OFFICE
CERTIFICATE OF CORRECTION

PATENT NO. : 4,661,303
DATED : April 28, 1987
INVENTOR(S) : Chum et al.

It is certified that error appears in the above-identified patent and that said Letters Patent is hereby corrected as shown below:

Column 3, line 18, "╱" should be -- ╱ --.

Column 3, line 19, "$(CH_2)_n$" should be --$(CR_2)_n$--.

Column 7, line 51, "lamina!e" should be --laminate--.

Signed and Sealed this

Thirty-first Day of May, 1988

Attest:

DONALD J. QUIGG

*Attesting Officer*  Commissioner of Patents and Trademarks